United States Patent [19]

Greenfield et al.

[11] Patent Number: 4,817,743

[45] Date of Patent: Apr. 4, 1989

[54] BUTTERFLY-TYPE SHIM HAVING SEMI-OPENED BOTTOM AND DOUBLE SANDWICH BRAZE JOINT PRODUCED THEREWITH

[75] Inventors: Mark S. Greenfield, Cary, N.C.; Stephen P. Stiffler, New Enterprise; Raymond D. Evans, Everett, both of Pa.

[73] Assignee: Kennametal Inc., Latrobe, Pa.

[21] Appl. No.: 24,945

[22] Filed: Mar. 12, 1987

[51] Int. Cl.[4] .............................................. E21B 10/58
[52] U.S. Cl. ........................................ 175/411; 228/57
[58] Field of Search ...................... 228/56.3, 122, 189, 228/57; 175/410, 411

[56] References Cited

U.S. PATENT DOCUMENTS

| | | | |
|---|---|---|---|
| 2,024,686 | 12/1935 | Farmer | 219/10 |
| 2,916,001 | 12/1959 | Chyle et al. | 228/216 |
| 3,001,059 | 9/1961 | Jones | 219/137 |
| 3,332,140 | 7/1965 | Sugiura et al. | 228/175 |
| 3,526,954 | 9/1970 | Katz et al. | 228/175 |
| 4,073,427 | 2/1978 | Keifert et al. | 228/165 |
| 4,147,914 | 4/1979 | Body | 219/86.9 |
| 4,601,151 | 7/1986 | Nunley et al. | 52/410 |
| 4,688,652 | 8/1987 | Crist | 175/410 |

*Primary Examiner*—Richard K. Seidel

*Attorney, Agent, or Firm*—Thomas R. Trempus

[57] ABSTRACT

Formation of a double sandwich braze joint between the steel body of a bit and a carbide insert tip disposed in a groove formed across the body is facilitated by a butterfly-type shim having a semiopened bottom placed within the groove between surfaces on the bit body defining the groove and adjacent surfaces on the insert tip. The shim has a pair of upstanding spaced side walls and a pair of spaced bottom webs extending between and interconnecting the side walls so as to dispose them between adjacent side surfaces of the bit body groove and insert tip, with lower edges of the shim side walls disposed generally above the bottom webs. The bottom webs rest on the bottom surface of the bit body groove and, in turn, elevate the shim side walls so that their lower edges are spaced above the groove bottom surface. The bottom webs also support the insert tip in spaced relation above the groove bottom surface so as to define a gap which extends across and above the groove bottom surface, below the insert tip bottom surface and the shim side wall lower edges, and between the opposite side surfaces of the bit body groove. The gap will allow relatively unrestricted molten braze alloy flow across the groove bottom surface to facilitate setting up of capillary flow upwardly along adjacent surfaces of the bit body and insert tip on opposite sides of the shim side walls to produce the braze joint.

2 Claims, 3 Drawing Sheets

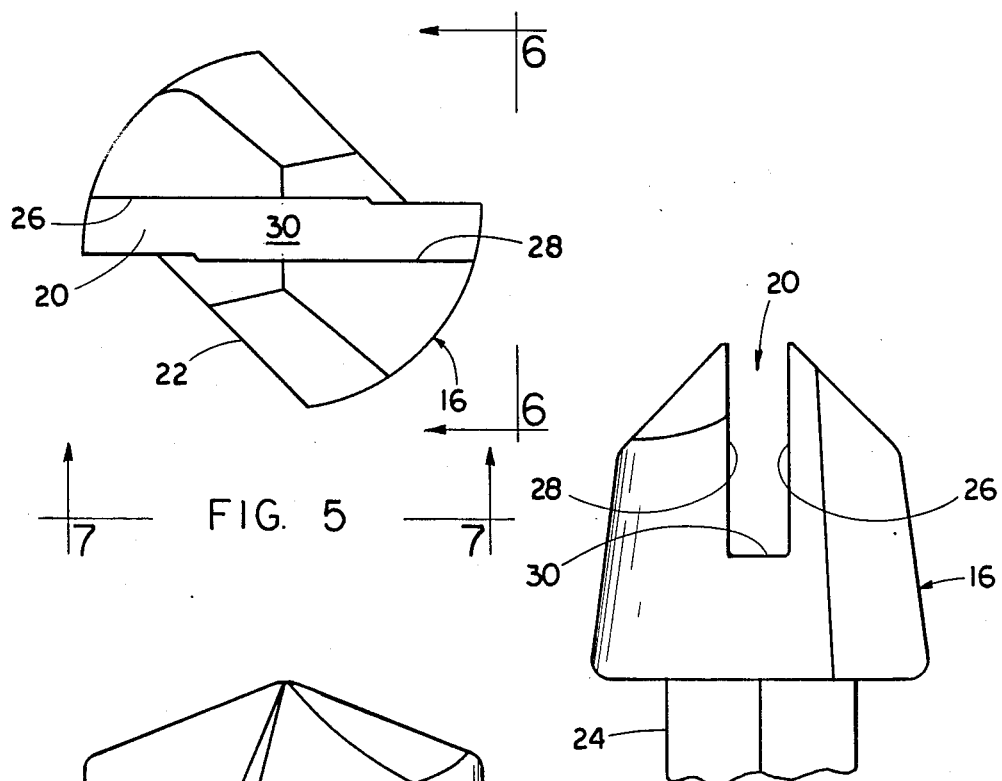
FIG. 5
FIG. 6
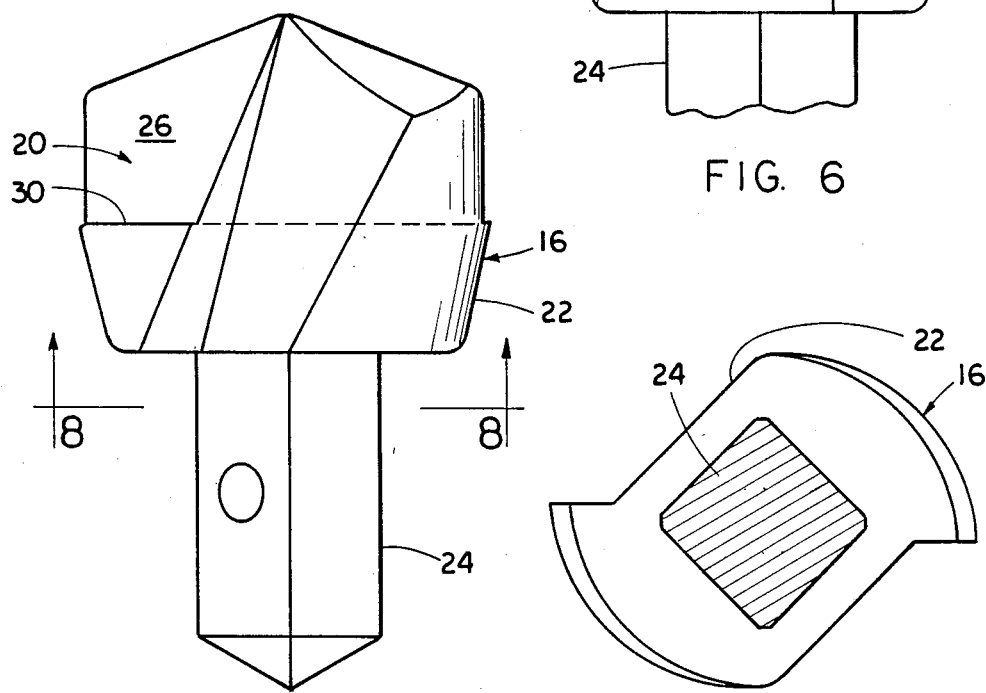
FIG. 7
FIG. 8

4,817,743

BUTTERFLY-TYPE SHIM HAVING SEMI-OPENED BOTTOM AND DOUBLE SANDWICH BRAZE JOINT PRODUCED THEREWITH

BACKGROUND OF THE INVENTION

1. Field of the Invention

The present invention generally relates to mining and construction tools and, more particularly, is concerned with an improved butterfly-type shim having a semi-opened bottom and a double sandwich braze joint produced between a bit body and insert tip which incorporates such shim.

2. Description of the Prior Art

Considering that thermal expansion rates of hard carbide and tungsten alloys vary from one-third to one-half that of steel, over the years brazing has proven to be an extremely successful and advantageous method of mounting carbides to steel. While it is most satisfactory when applied to small-area, short-length joints, it can also be satisfactorily applied to larger joints. However, whereas small joints are produced by relative simple, straightforward construction methods, large joints normally require more complicated methods to avoid difficulties which would otherwise be encountered in construction of the large joints.

These difficulties stem from the amount of thermal or brazing strain created in the joined parts during formation of the braze joint. The amount of brazing strain created in small areas or short lengths of parts as a braze joint between them solidifies is usually minor and normally absorbed without materially weakening the joined parts. On longer parts or larger areas, however, the brazing strain becomes proportionately greater and can lead to considerable bending and frequently to fracture of the carbide part. Thus, more complicated methods of construction have been used heretofore to relieve brazing strains induced in carbide and steel parts by these longer or larger braze joints.

One method of construction to relieve brazing strain is to use a sandwich braze joint composed of a shim of a malleable metal, such as copper, between the carbide and steel parts. The malleable metal shim does not melt during brazing of the joint and will deform under the brazing strain without losing its bond to the steel or carbide parts, thus relieving the strain to a large degree.

Other methods of construction are to use a copper shim assembled between two shims of silver solder, or to use a three-ply shim composed of a layer of silver solder on either side of the copper.

One prior shim having a butter-fly design has been proposed heretofore to form a double sandwich-type braze joint for mounting a carbide insert tip in an elongated groove defined in a bit body. This butterfly-type shim is generally U-shaped having upstanding side walls spaced apart and interconnected by a closed or solid bottom wall. However, when the shim is placed in the groove between the interior bottom and opposite side surfaces of the bit body which define the groove and the exterior bottom and opposite side surfaces of the insert tip which is fitted into the groove, the respective exterior and interior surfaces on the side walls and bottom wall of the shim make flush contact with the adjacent bit body and insert tip surfaces.

Although this prior art butterfly-type shim having a solid bottom is intended to provide a double sandwich-type braze joint, underlying the present invention as described hereinafter is a recognition that the solid bottom of the shim substantially impedes the necessary distribution of molten brazing alloy across the bottom of the groove for setting up of capillary flow of the braze alloy upwardly between the adjacent surfaces of the bit body, insert tip and shim. Thus, the double sandwich joint can not be produced effectively and consistently using this prior shim design. Formation of an incomplete and thus ineffective braze joint will limit the reliability and useful life of the tool.

The aforementioned drawback with respect to the solid-bottom butterfly-type shim is not satisfactorily overcome by the mere total elimination of the bottom, which will leave the shim composed of two unconnected side walls. The insert bottom surface and groove bottom surface now make relatively flush contact with one another which will still impede free flow of molten braze alloy across the bottom of the groove for setting up of the necessary capillary flow to complete the joint.

Consequently, a need exists for an improved technique to produce a more effective braze joint between the bit body and insert tip so as to provide a more durable tool having an increased useful life.

SUMMARY OF THE INVENTION

The present invention provides an improved butterfly-type shim which facilitates reliable formation of a double sandwich braze joint designed to satisfy the aforementioned needs. The improved shim of the present invention has a pair of upstanding side walls being spaced apart and interconnected at their lower edges by a pair of transverse bottom webs which define a semi-opened bottom in the shim. When the improved shim is placed in the bit body groove, its webs rest on the bottom surface of the bit body groove and, in turn, elevate its side walls in spaced relation to and above the groove bottom surface such that the lower edges of the side walls are spaced thereabove also. In addition, the shim bottom webs support the insert bit in overlying relation to and spaced above the groove bottom surface so as to define a space or gap which extends across the bottom of the groove, below the insert tip and the lower edges of the shim side walls, and between the opposite interior side surfaces of the bit body defining the sides of the groove.

The gap so defined by the shim allows relatively unrestricted, free flow of molten braze alloy across the floor or bottom of the groove and allows the effective setting up of capillary flow of braze alloy upwardly along the adjacent parallel surfaces of the bit body, insert tip and shim to more reliably form a completed double sandwich joint therebetween.

The double sandwich braze joint is made up of at least four braze subjoints: two outer subjoints between the opposite interior surfaces on the bit body forming the sides of the groove and the corresponding adjacent opposite exterior surfaces on the shim side walls; and two inner subjoints between the opposite exterior surfaces on the insert tip and the corresponding adjacent interior surfaces on the shim sidewalls. Although the prior art butterfly-type shim is intended to provide a double sandwich braze joint having the four subjoints, as explained earlier its solid bottom substantially impedes free flow of molten braze alloy across the groove bottom and the setting up of capillary flow of braze alloy upwardly between the adjacent surfaces of the bit body, insert tip and shim so that such joint cannot be completely produced in a consistently reliable manner.

Accordingly, the present invention is directed to a butterfly-type shim for facilitating formation of a double sandwich braze joint. The shim comprises: (a) a pair of upstanding side walls having lower edges; and (b) at least one bottom web having opposite end portions. The bottom web extends in transverse relationship to and between the side walls and is connected at its opposite end portions to the lower edges of the side walls so as to dispose the side walls in spaced apart relationship to one another and the lower edges of the side walls generally above the bottom web. Preferably, the shim has at least a pair of bottom webs. Each bottom web is substantially less in width than the lengths of the shim side wall lower edges so as to provide the shim with a semi-opened bottom.

More particularly, the side walls and bottom webs of the shim are formed from a one-piece thin sheet of metallic material. Also, each bottom web includes a main portion extending between the opposite end portions thereof and has a generally flat configuration. Each opposite end of the bottom web merges from the main portion and is upturned through approximately ninety degrees with respect thereto.

Further, the present invention is directed to the combination of a bit body, carbide insert tip and the above-defined butterfly-type shim. The bit body has interior opposite side surfaces and an interior bottom surface interconnecting the side surfaces to define an elongated groove across the body. The insert tip has exterior opposite side surfaces and an exterior bottom surface. The insert tip is sized relative to the groove to fit within the groove in spaced relation to the corresponding side and bottom surfaces of the body defining the groove. The butterfly-type shim is disposed within the groove between the respective corresponding interior and exterior surfaces of the bit body and insert tip for facilitating formation of the double sandwich braze joint between the bit body and insert tip on opposite sides of the shim side walls.

More particularly, each bottom web rests on the bottom surface of the bit body groove and, in turn, thereby elevates the shim side walls in spaced relation above the groove bottom surface such that the lower edges of the side walls are spaced thereabove also. In addition, each bottom web supports the insert bit at its exterior bottom surface in overlying relation to and spaced above the groove bottom surface so as to define a gap which extends across and above the bottom surface of the groove, below the insert tip bottom surface and the lower edges of the shim side walls, and between the opposite interior side surfaces of the bit body. In such way, the gap will allow relatively unrestricted, free flow of molten braze alloy across the bottom surface of the groove and thereby facilitate effective setting up of capillary flow of braze alloy upwardly along corresponding adjacent surfaces of the bit body and insert tip on opposite sides of the shim side walls to produce the double sandwich braze joint therebetween.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a top plan view of the bit body by itself.

FIG. 6 is a side elevational view of the bit body as seen along line 6—6 of FIG. 5, with a lower portion of the body being broken away.

FIG. 7 is another side elevational view of the bit body as seen along line 7—7 of FIG. 5, with the bit body being rotated approximately ninety degrees with respect to its position in FIG. 6.

FIG. 8 is a cross-sectional view of the bit body taken along line 8—8 of FIG. 7.

DETAILED DESCRIPTION OF THE INVENTION

Figure 1:
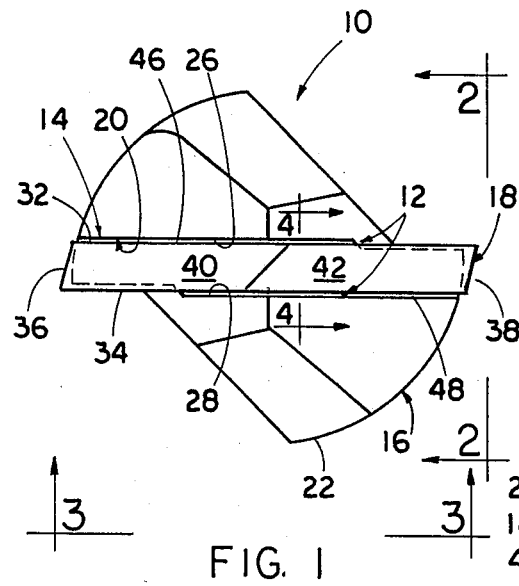
FIG. 1 is a top plan view of a double sandwich braze joint in a bit, the joint being constructed in accordance with the principles of the present invention between the body of the bit, an insert tip and a butterfly-type shim of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 11:
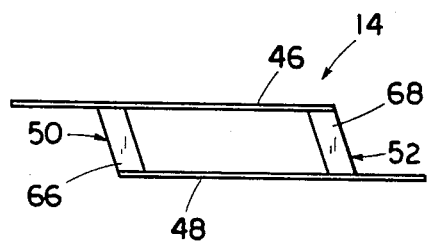
FIG. 11 is a top plan view of the shim as seen along line 11—11 of FIG. 9.
Figure 12:
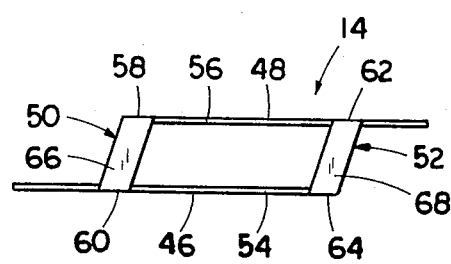
FIG. 12 is a bottom plan view of the shim as seen along line 12—12 of FIG. 9.
Figure 13:
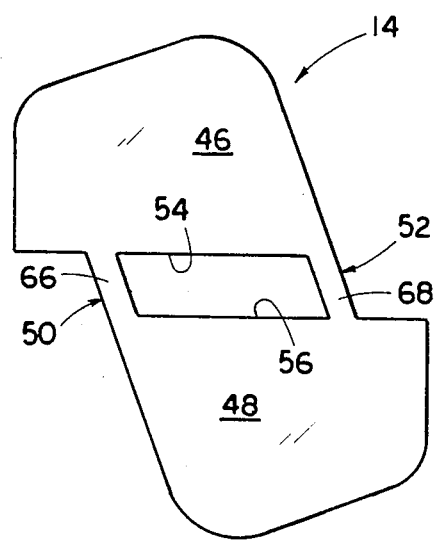
FIG. 13 is a plan view of the shim in blank form before being folded into the final shape shown in FIG. 9.

Referring now to the drawings, and particularly to FIGS. 1-4, there is shown a bit, generally designated by the numeral 10, which employs a double sandwich braze joint 12 constructed in accordance with the principles of the present invention, using a butterfly-type shim 14 having a semi-opened bottom, as can be readily seen in FIGS. 11 and 12. The bit 10 is particularly useful in mining and construction and commonly referred to as a roof bit.

More particularly, the double sandwich braze joint 12 is formed between a body 16 of the bit 10, for example, being composed of steel, and a hard carbide insert tip 18 disposed in a slot or groove 20 defined across a forward head 22 on the body 16 (in transverse relation to a longitudinal axis A of the bit 10), with the semi-opened bottomed shim 14 being placed within the groove 20 and interposed between respective surfaces on bit body 16 defining the groove 20 and adjacent surfaces on the insert tip 18 which face toward the surfaces on the bit body. Basically, the bit body 16 and carbide insert tip 18 per se are conventional, whereas the shim 14 and the construction of the double sandwich braze joint 12 by use of the shim 14 with the conventional bit body 16 and insert tip 18 comprise the present invention.

Referring to FIGS. 5-8, along with FIGS. 1-4, the steel body 16 has a rearward shank 24 which supports the forward head 22 having the elongated transverse groove 20 defined thereacross. The groove 20 is defined by a pair of opposing, spaced-apart side surfaces 26,28 and a bottom surface 30 formed across the interior of the bit body head 22. The bottom surface 30 extends transverse to and interconnects the side surfaces 26,28 at their inner ends so as to define the elongated groove 20 with generally a rectangular shape in cross-section. As seen in FIG. 5, the side surfaces 26,28 of the groove 20 have offset or zigzag contours for accommodating the shim 14 therealong.

Figure 2:
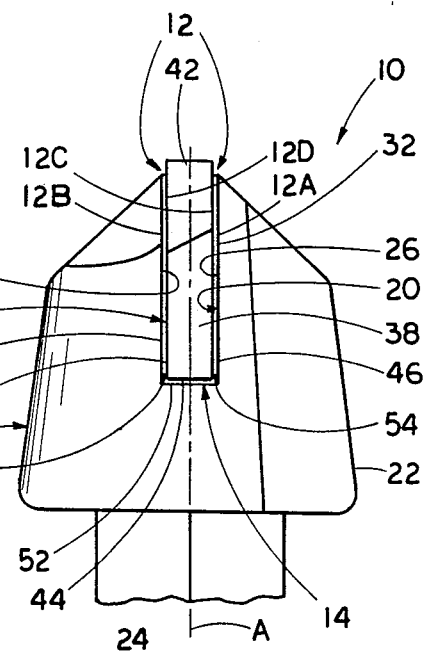
FIG. 2 is a side elevational view of the bit as seen along line 2—2 of FIG. 1, with a lower portion of the bit being broken away.
Figure 3:
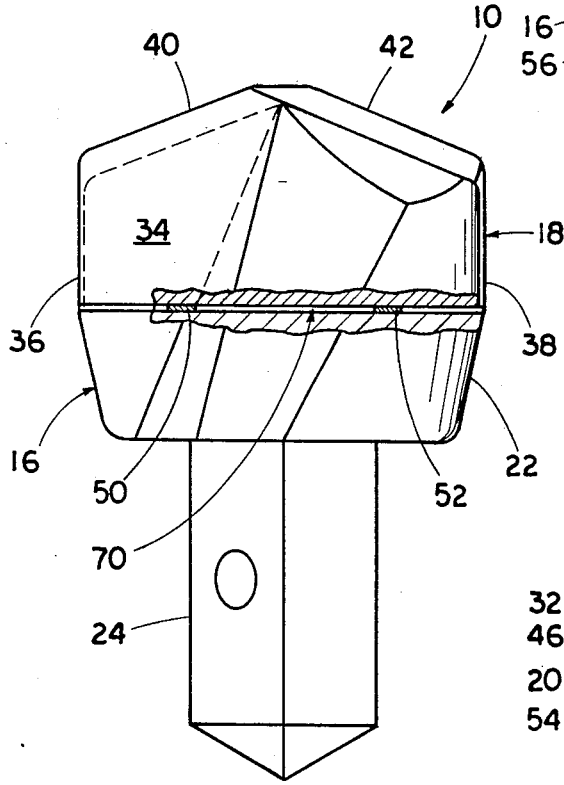
FIG. 3 is another side elevational view of the bit as seen along line 3—3 of FIG. 1, with the bit being rotated approximately ninety degrees with respect to its position in FIG. 2 and having portions broken away and sectioned to expose the bottom webs of the butterfly-type shim.
Figure 4:
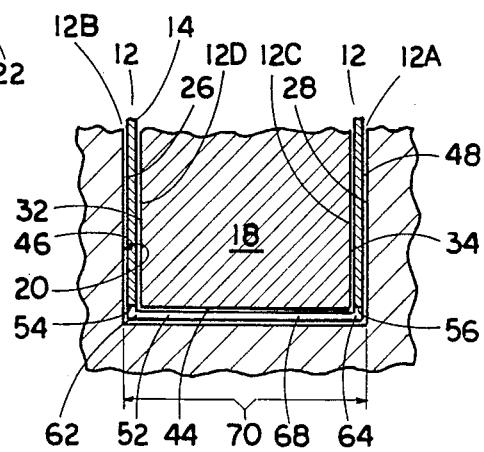
FIG. 4 is an enlarged fragmentary sectional view of the bit taken along line 4—4 of FIG. 1 with the spaces between the bit body, insert tip and shim being exaggerated in size to illustrate the flow path of the braze alloy and the locations of the subjoints of the double sandwich braze joint formed therebetween.
Figure 9:
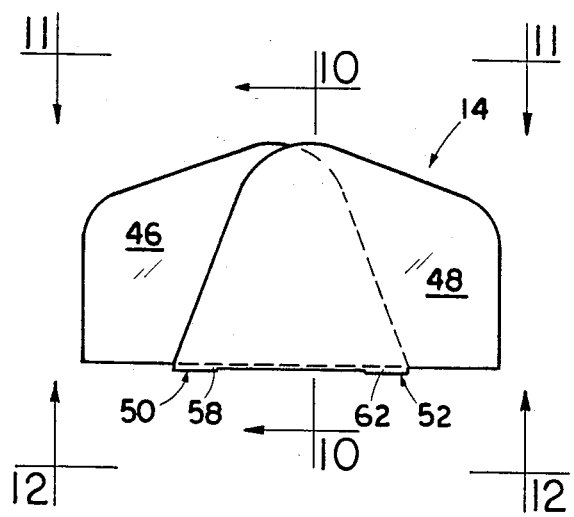
FIG. 9 is a side elevational view of the butterfly-type shim of the present invention by itself.
Figure 10:
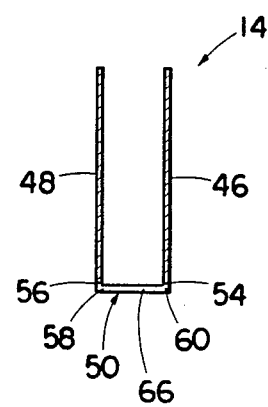
FIG. 10 is a cross-sectional view of the shim taken along line 10—10 of FIG. 9.

As seen in FIGS. 1-3, on its exterior the carbide insert tip 18 includes a pair of oppositely-facing, generally parallel, side surfaces 32,34; a pair of oppositely-facing, generally parallel, end surfaces 36,38; a pair of adjacent, oppositely-inclined, top surfaces 40,42 extending between and interconnecting the side and end pairs of surfaces; and a bottom surface 44 extending transversely to and interconnecting the side and end pairs of surfaces. The insert tip 18 has a generally rectangular shape in cross-section and is sized relative to the bit body groove 20 to fit within the groove in closely spaced relation to the corresponding interior side and bottom surfaces 26,28,30 of the body 16 defining the groove. In view of the zigzag contour of the groove side surfaces 26,28 and the spacing between the insert tip surfaces and the groove surfaces, the shim 14 can be disposed within the groove 20 between the respective corresponding interior and exterior surfaces of the bit body 16 and insert tip 18 for facilitating formation of a double sandwich braze joint between the bit body 16 and insert tip 18 on opposite sides of the shim 14.

Referring now to FIGS. 9-13, as well as to FIGS. 1-4, the semi-opened bottomed butterfly-type shim 14 is illustrated having a pair of upstanding spaced side walls 46,48 and a pair of bottom strips or webs 50,52. The bottom webs 50,52 are spaced apart from one another and extend in transverse relation between, and integrally interconnect, the side walls so as to dispose them between respective adjacent spaced side surfaces 26,28 and 32,34 of the bit body groove 20 and insert tip 18, with lower edges 54,56 of the respective shim side walls 46,48 disposed generally above the bottom webs 50,52.

More particularly, the bottom webs 50,52 have respective opposite end portions 58,60 and 62,64 and respective main portions 66,68 extending between and integrally connected with the end portions. Each main portion 66,68 has a generally flat configuration, whereas each opposite end portion 58-64 is upturned through approximately ninety-degrees with respect to the respective main portion. The configuration of the opposite end portions 58-64 of the bottom webs 50,52 at which the latter are connected to the lower edges 54,56 of the shim side walls 46,48 are responsible for disposing the shim side wall lower edges generally above the bottom webs 50,52. Further, as is readily apparent in FIGS. 9 and 11-13, the bottom webs 50,52 are substantially less in width than the lengths of the shim side wall lower edges 54,56 so as to provide the shim 14 with the aforementioned semi-opened bottom configuration.

Referring again to FIGS. 1-4, it is seen that in the braze joint 12 the bottom webs 50,52 rest on the bottom surface 30 of the bit body groove 20 and, in turn, elevate the shim side walls 46,48 in spaced relation above the groove bottom surface 30 such that the lower edges 54,56 of the shim side walls are spaced thereabove also. In addition, the bottom webs 50,52 support the insert bit 18 at its bottom surface 44 such that the latter surface overlies and is spaced above the groove bottom surface 30 so as to define a gap, generally indicated at 70.

The gap 70 extends between the bottom webs 50,52 across and above the bottom surface 30 of the groove 20, below the insert tip bottom surface 44 and the lower edges 54,56 of the shim side walls 46,48, and between the inner ends of the opposite side surfaces 26,28 of the bit body groove 20. In forming the braze joint 12, a solid bar of braze alloy (not shown) will be placed in the groove 20 under the shim bottom webs 50,52 and heated to a molten state. Thus, the gap 70, with the breadth and reach as just described, will allow relatively unrestricted, free flow of molten braze alloy across the bottom surface 30 of the groove 20 and thereby facilitate effective setting up of capillary flow thereof upwardly along corresponding adjacent side surfaces 26,28 and 32,34 of bit body 16 and insert tip 18 on opposite sides of the shim side walls 46,48 to produce the double sandwich braze joint 12 therebetween having a consistently high quality. Referring to FIGS. 2 and 3, it is seen that the braze joint 12 is made up of at least four braze subjoints: two outer ones 12A, 12B between the opposite interior side surfaces 26,28 on the bit body groove 20 and the adjacent opposite exterior sides of the shim side walls 46,48; and two inner ones 12C,12D between the opposite exterior surfaces 32,34 on the insert tip 18 and the adjacent opposite interior sides of the shim side walls 46,48.

It should now be clearly understood that the semi-opened bottom of the shim 14 means that only a minimum portion of the shim rests on the bottom surface 30 of the groove 20. It is conceivable that only a single narrow bottom web could be provided to connect the side walls 46,48 of the shim and still retain the advantages of the semi-opened bottom with respect to relatively unrestricted braze flow to either side of the shim side walls. However, it is preferable to use two webs for they would seem to better tie together and support the two side walls for ease of assembly and positioning of the shim in the groove.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

We claim:

1. A butterfly-type shim for facilitating formation of a double sandwich braze joint, said shim comprising:
    (a) a pair of upstanding side walls having lower edges; and (b) at least a pair of bottom webs each including a main portion having a generally flat configuration and extending between opposite end portions, each opposite end portion of said bottom web merging from said main portion and being upturned through approximately ninety-degrees with respect thereto, said each bottom web being spaced apart from the other, extending in transverse relationship to and between said side walls and connected at its opposite end portions to said lower edges of said side walls so as to dispose said side walls in spaced apart relationship to one another and said lower edges of said side walls generally above said bottom web main portion;

(c) said each bottom web being substantially less in width than the lengths of said side wall lower edges and being spaced apart to define a through-opening therebetween.

2. In combination with a bit body having interior opposite side surfaces and an interior bottom surface interconnecting said side surfaces to define an elongated groove across said body and a carbide insert tip having exterior opposite side surfaces and an exterior bottom surface and being sized relative to said groove to fit within said groove in spaced relation to said corresponding side and bottom surfaces of said body defining said groove, a butterfly-type shim being disposed within said groove between said respective corresponding interior and exterior surfaces of said bit body and insert tip for facilitating formation of a double sandwich braze joint between said bit body, insert tip and shim, said shim comprising:

(a) a pair of upstanding side walls having lower edges; and (b) at least a pair of bottom webs each including a main portion having a generally flat configuration and extending between opposite end portions, each opposite end portion of said bottom web merging from said main portion and being upturned through approximately ninety-degrees with respect thereto, said each bottom web being spaced apart from the other, extending in transverse relationship to and between said side walls and connected at its opposite end portions to said lower edges of said side walls so as to dispose said side walls in spaced apart relationship to one another and said lower edges of said side walls generally above said bottom web main portion;

(c) said each bottom web resting on said bottom surface of the bit body groove and, in turn, thereby elevating said shim side walls in spaced relation above said groove bottom surface such that said lower edges of said side walls are spaced thereabove also;

(d) said each bottom web being substantially less in which than the lengths of said shim side wall lower edges and bearing spaced apart to define a through-opening therebetween;

(e) said each bottom web supporting said insert bit at its exterior bottom surface in overlying relation to and spaced above the groove bottom surface so as to define a gap which extends across and above said bottom surface of said groove, below said insert tip bottom surface and said lower edges of said shim side walls, and between said opposite interior side surfaces of said bit body such that said gap will allow relatively unrestricted, free flow of molten braze alloy across said bottom surface of said groove and thereby facilitate effective setting up of capillary flow of braze alloy upwardly along corresponding adjacent surfaces of said bit body and insert tip on opposite sides of said shim side walls to produce the double sandwich braze joint therebetween.

* * * * *